United States Patent [19]
Darnell et al.

[11] Patent Number: 5,234,591
[45] Date of Patent: Aug. 10, 1993

[54] COUNTER-CURRENT FLOW HOLLOW FIBER PERMEATOR

[75] Inventors: Charles P. Darnell; Francis X. Mayer, both of Baton Rouge

[73] Assignee: Exxon Research & Engineering Company, Florham Park, N.J.

[21] Appl. No.: 802,158

[22] Filed: Dec. 4, 1991

[51] Int. Cl.$^5$ .............................................. B01D 69/08
[52] U.S. Cl. ............................ 210/321.81; 210/500.23
[58] Field of Search .................... 210/500.23, 321.81, 210/321.9, 321.88; 422/48; 55/16, 158

[56] References Cited

U.S. PATENT DOCUMENTS

| | | | |
|---|---|---|---|
| 3,690,465 | 9/1972 | McGinnis et al. | 210/321 |
| 3,957,648 | 5/1976 | Roget et al. | 210/321 |
| 4,108,764 | 8/1978 | Kaneko et al. | 210/22 |
| 4,220,535 | 9/1980 | Leonard | 210/321 |
| 4,231,879 | 11/1980 | Spranger | 210/321 |
| 4,367,139 | 1/1983 | Graham | 210/321.1 |
| 4,671,875 | 6/1987 | Stookey | 210/321.1 |
| 4,871,379 | 10/1989 | Edwards | 55/158 |
| 4,906,362 | 3/1990 | Holm et al. | 210/196 |
| 4,923,679 | 5/1990 | Fukasawa et al. | 422/48 |
| 4,929,259 | 5/1990 | Caskey et al. | 55/158 |

FOREIGN PATENT DOCUMENTS

| | | |
|---|---|---|
| 2839937 | 4/1980 | Fed. Rep. of Germany ........................ 210/321.81 |
| 1500945 | 2/1978 | United Kingdom . |
| 2009034 | 6/1979 | United Kingdom . |
| 2011274 | 7/1979 | United Kingdom . |

Primary Examiner—Frank Spear
Attorney, Agent, or Firm—Joseph J. Allocca

[57] ABSTRACT

A hollow fiber permeator is described which permits counter-current flow in the passage of feed/retentate and permeate-sweep streams. The permeator comprises a bundle of hollow fibers compartmentalized using a series of concentric shells or a spiral wrap extending the entire length of the hollow fibers. The rings or spiral wrap are perforated along the top and bottom to permit even flow distribution through each of the compartments defined by the concentric rings or spiral wrap so that the linear flow rate down the length of the permeator is similar for each compartment.

10 Claims, 3 Drawing Sheets

COUNTER-CURRENT FLOW HOLLOW FIBER PERMEATOR

BACKGROUND OF THE INVENTION

1. Field of the Invention

The present invention is directed to hollow-fiber membrane permeators which permit counter-current flow within the permeators as between the exterior or shell-side and the interior or tube side of each hollow fiber in the permeator. Counter-current flow is much more efficient than co-current flow or transverse or cross-flow as now employed in hollow fiber permeators.

2. Description of Related Art

In fabricating hollow-fiber permeators, the fluid contacting efficiency and the flow-geometry are very important to the overall effectiveness of the permeator package. This is particularly important in perstraction, membrane enhanced extraction and membrane reactor cases where efficient contacting of two fluids can result in significantly improved performance. In cross-flow operation the flow along the shell sides of each hollow fiber is perpendicular to the tube-side-flow. In co-current operation the flow on both the shell side and tube side of each hollow fiber is parallel but in the same direction.

In many cases, co-current or cross-flow operations result in severe losses in performance. In concentration driven processes such as perstraction, a sweep liquid is used to carry away a product that permeates through the membrane. Due to the necessity of maintaining a concentration gradient co-current flow is especially inefficient requiring an extremely high sweep flow rate to maintain an effective gradient.

Cross-current or transverse-flow is somewhat better, requiring less sweep material to maintain an effective gradient. Due to sweep recovery costs the amount of sweep needed to carry out an efficient separation is critical to the overall process economics.

Numerous permeator designs have been put forward that give efficient contacting between the fluids passing on the shell-side and tube-side respectively of the hollow fibers but these designs typically result in cross-flow/transverse-flow where the shell side fluid flows in a path that is perpendicular to the path of the tube side fluid, or in less than optimal counter-current flow patterns.

U.S. Pat. No. 4,923,679 teaches a hollow fiber membrane type oxygenator and a method for its manufacture. This device permits passage of blood through the tube-side of the hollow fiber while oxygen passes counter-currently along the shell side of the fibers. The module contains no internals to allow for efficient flow distribution down the length of the exterior of the hollow fibers. If instead of oxygen a liquid were passed along the shell side of the hollow fibers the inability to insure the uniformity of flow along all the fiber lengths would evidence itself in permeate polarization in those areas where shell-side liquid flow is inadequate. Such permeate polarization in a concentration gradient driven permeation process is highly detrimental to the overall process efficiency; it reduces the effective transfer surface area of the module.

U.S. Pat. No. 4,231,879 teaches an apparatus for the selective separation of matter through semi-permeable membranes. The membranes are in the form of hollow fibers. The apparatus comprises a plurality of elongated frame assemblies each defining an elongated contacting chamber packed with hollow fibers. The elongated chambers are stacked side by side in fluid communications. The interior and exterior of the hollow fibers are isolated so that there is no fluid communicator between the interior and exterior of the fibers except through the fiber walls. A first fluid is passed through the tube-side of the fibers while a second fluid is passed counter-currently along the shell side of the fibers. Shell-side flow is in cascade fashion passing through the first elongated chamber in counter-current flow then through a non-contacting flow reversal chamber to be redirected into a second elongated chamber, again in counter-current flow and then in like fashion through a series of non-contacting flow reversal chambers and elongated contacting chambers until the shell side fluid exits the last contacting chamber and leaves the apparatus. The concentration of any permeate in the final elongated chambers could match the concentration of the permeate accumulated by the shell side fluid as it passes through the preceding elongated chambers. Thus, in concentration gradient driven systems the efficiency of the final chambers as could be quite lower again, in effect, reducing the effective transfer surface area of the apparatus.

GB 1,500,945 teaches a dialysis apparatus comprising a series of elongated chambers filled with hollow fibers. The interior and exterior of the fiber are fluidly isolated from each other. Means are provided for permitting a serpentine flow of fluid along the shell side of the fiber. Consequently, then, shell side flow will be counter-current along the fibers in one chamber but co-current along the fibers through the next chamber in series, and alternating thereafter until the fluid finally exiles the apparatus. Alternately the shell side fluid can pass in zig-zag fashion perpendicular across the membranes in each chamber bundle (transverse flow) before exiting the apparatus.

U.S. Pat. No. 3,957,648 teaches a hollow fiber element wherein a leak proof band is wound in the form of a spiral the turns of which spiral are cylinders radially spaced from one another within the element jacket and hollow fibers extend axially through the jacket occupying the radially spaced cylinders of the spiral. Flow along the shell side of the hollow fibers is transverse or cross-flow across the fibers following the path of the spiral from the interior of the spiral to the end of the spiral in the element.

U.S. Pat. No. 4,220,535 teaches a multi-zoned hollow fiber permeator. The flow in this permeator is transverse to the orientation of the hollow fibers. The improvement in the design is the placing of at least one transverse oriented impermeable barrier intermediate along the length of the hollow fibers within the housing. These barriers are an attempt to reduce flow channeling in the hollow fiber bundle and thus reduce permeate polarization.

U.S. Pat. No. 4,906,362 teaches a membrane filter which comprises one or several tubular flow channels for liquid which is to be treated in the filter. The walls of the flow channels consist on the inner side of membranes, which are supported by a supporting structure. An outer casing surrounds the flow channels and limits a collection space for permeate between the casing and the flow channels. According to the invention the flow channels and the said collection space are connected to separate outer circuits, comprising pumps to bring the liquid which is to be filtered as well as permeate to circulate concurrently past the membrane filter. The collection space is filled by filling bodies, which constituent an essential mechanical hindrance for the flow of circulating permeate. Means in the form of disks provided with holes, which abut against the outer casing, are arranged at the inlet to the flow channels. These means are arranged to retain the filling bodies in the collection space and distribute the flow of circulating permeate over the same.

U.S. Pat. No. 4,929,259 teaches a hollow fiber membrane fluid separation module for tube side feed. In one embodiment provision is made for the use of sweep fluid to pass counter-currently along the shell side of the hollow fibers. In that embodiment the hollow fibers are bundled around a hollow core. The hollow fibers and hollow core extend through tube sheets at the ends of the bundles. The hollow core has fluid inlet means at one end and is plugged at the other. At the plugged end the hollow core has perforations to permit fluid exit into one end of the hollow fiber bundle. A series of circular baffles co-axial with the hollow core divide the hollow fiber bundle into a series of circular chambers. The baffles are spaced away from the tube sheets at either end of the bundle. Tube-side and shell-side flow are counter-current. The sweep liquid exiting the center core passes across the top of the baffles surrounding the hollow fibers, then passed down the circular chambers defined by the circular baffles, passing along the shell side of the hollow fibers in the circular chambers. The sweep fluid exits the circular baffle chambers and exits the vessel housing the hollow fibers. The baffles channel the sweep fluid flow counter-current by along the shell side of the hollow fibers as compared to cross or transverse flow.

While improved counter-current and cross-current flow hollow fiber elements have been described, it would be an improvement if, with regard to counter-current flow hollow fiber elements the counter-current flow past each fiber could be controlled so as to be uniform and substantially the same past each fiber, thereby insuring no permeate polarization and maximizing element efficiency.

SUMMARY OF THE INVENTION

Figure 1:
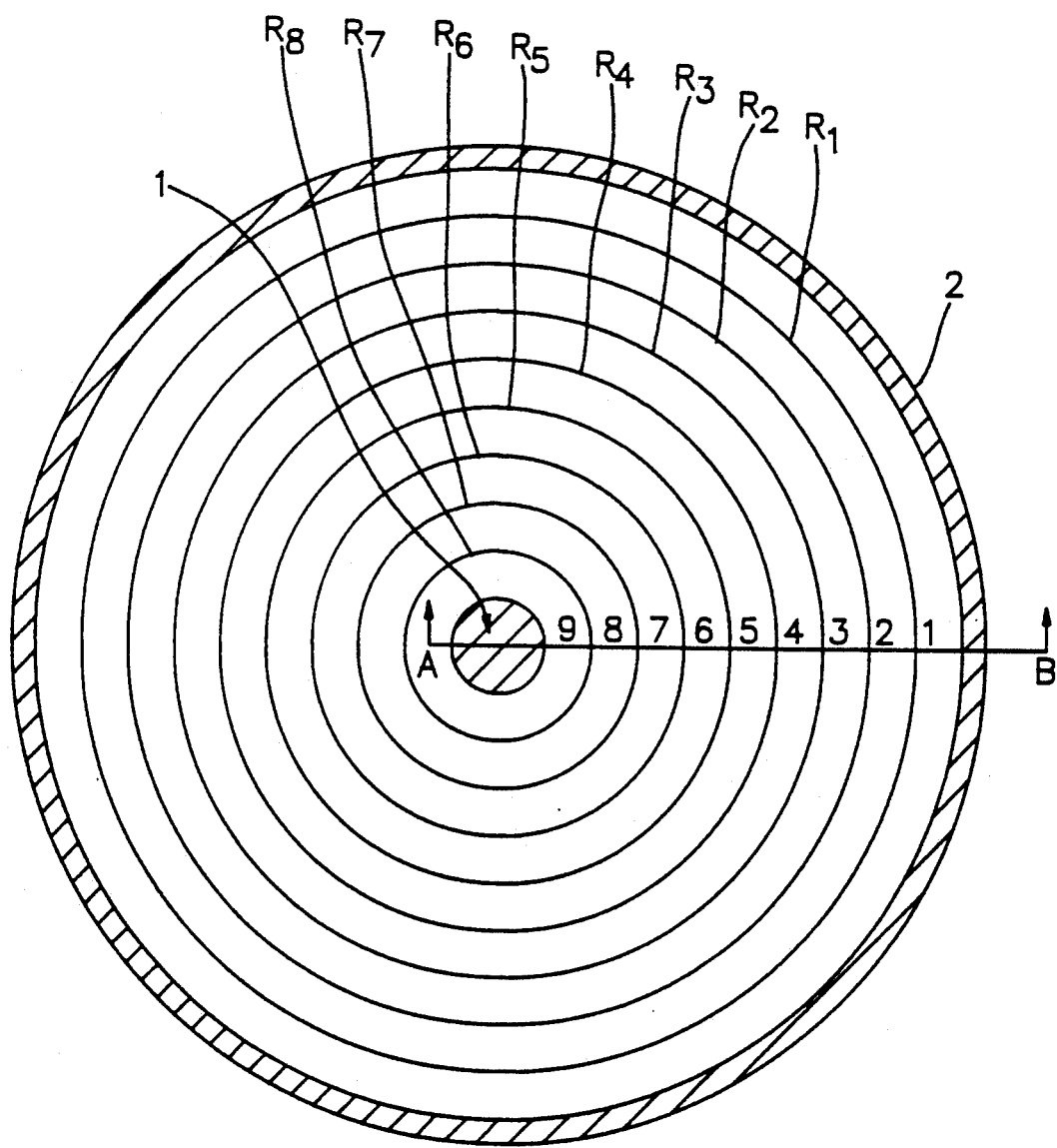
FIG. 1 is a cross-section of the concentric ring chamber hollow fiber bundle with each ring individually numbered.

The present invention is a hollow fiber permeator comprising a bundle of hollow fibers parallel to a central mandrel core, compartmentalized by means of concentric rings or spiral wrap of equal length with the hollow fibers. The tops and bottoms of said rings or spiral wrap are perforated to permit the passage of controlled quantities of fluid into the annuli defined by said rings or spiral wrap so that the linear flow rate down the length of the permeator is similar in each annulus.

DESCRIPTION OF THE PREFERRED EMBODIMENTS

The present invention is a hollow fiber permeator which allows for efficient counter-current flow within the permeator. The permeator comprises a bundle of many hollow fibers arranged parallel to the length of a central mandrel core which is perforated at one end and plugged at the other. The fibers are compartmentalized into discrete compartments co-axial with the central mandrel by the use of a series of concentric rings or a spiral wrap concentric with the central mandrel, with the rings or the wrap containing perforations at the top (inlet perforations) and the bottom (outlet perforations) of the permeator at either end of the rings or spiral wrap and perpendicular to the axis of the central mandrel. The amount or size of the perforations per ring or each complete spiral wrap turn are set to allow for an even distribution of the shell side fluid (flow along the outside of the hollow fibers) into each of the fiber compartments (annuli), so that the linear flow rate down the length of the permeator is similar for each compartment (annulus). The tube-side fluid flows through the bores of the hollow fibers in the opposite direction of the shellside fluid to establish countercurrent flow. The hollow fibers, central mandrel, and concentric rings or spiral wrap are embedded at both ends in tube sheets and surrounded by a vessel shell. The tube sheets are in fluid tight contact with the interior wall of the vessel shell. The perforations in the central mandrel and in the concentric rings or spiral wrap are not themselves embedded in the tube sheets but are spaced at or only a short distance away from the tube sheets in the interior zone of the module defined by the tube sheets. The vessel shell contains openings in one end of the wall in proximity to the tube sheets as fluid entrance means. A first fluid, introduced into the vessel through this opening is distributed evenly through the annuli of the concentric rings or spiral wrap by passage through the inlet perforations in said concentric rings or spiral wrap located at the same end of the vessel as the opening. These are the top or inlet perforations. The shell side first fluid passes through the inlet perforations and down the annuli. At the opposite end of the vessel this fluid passes through the other set of perforations in the concentric ring or spiral wrap (outlet perforation) and is collected in the perforated end of the central mandrel. The hollow fibers, central mandrel, and concentric rings or spiral wrap are embedded in the tube sheets. The hollow fibers and the central mandrel extend through the tube sheets. The central mandrel core is perforated at the end opposite the fluid entrance means in the vessel wall. The other end of the central mandrel core is plugged. The ends of the vessel shell are capped by end pieces creating manifold means chambers into which the open ends of the hollow fibers extending through the tube sheets are in fluid communication. The manifold means permits introduction of a second fluid into the permeator and recovery of fluid from the permeator. The unplugged end of the central manifold extend through and beyond the manifold means chambers and operate as fluid passage means.

In a typical operation a fluid to be separated into its components is introduced into the feed fluid entrance manifold means chamber to pass through the tube side of the hollow fibers. This entrance manifold means chamber is on the end of the vessel opposite the fluid entrance openings in the wall of the vessel shell. Sweep fluid is introduced into the vessel shell through the sweep fluid entrance openings located at the end of the vessel opposite the feed fluid entrance manifold means chamber. The sweep liquid is distributed through the holes or perforations (inlet perforations) at the first end of the concentric rings or spiral wrap opposite the fluid entrance manifold means chamber and passes at a uniform flow rate through each compartment (annulus) containing hollow fibers defined by the concentric rings or spiral wrap in counter-current flow along the shell side of the hollow fibers sweeping away from the hollow fibers any permeate which passes from the feed on the tube side of the hollow fiber to the shell side of the hollow fiber. The permeate rich sweep fluid passes down the annulus and through holes or perforations (outlet perforations) along the second end of the concentric rings or spiral wrap and into the central mandrel through the perforations in the end of the mandrel and then is discharged from the vessel. The feed/retentate on the tube side of the hollow fibers pass into the exit manifold means chamber at the end of the vessel opposite the fluid entrance manifold means and also are discharged from the vessel.

Figure 3:
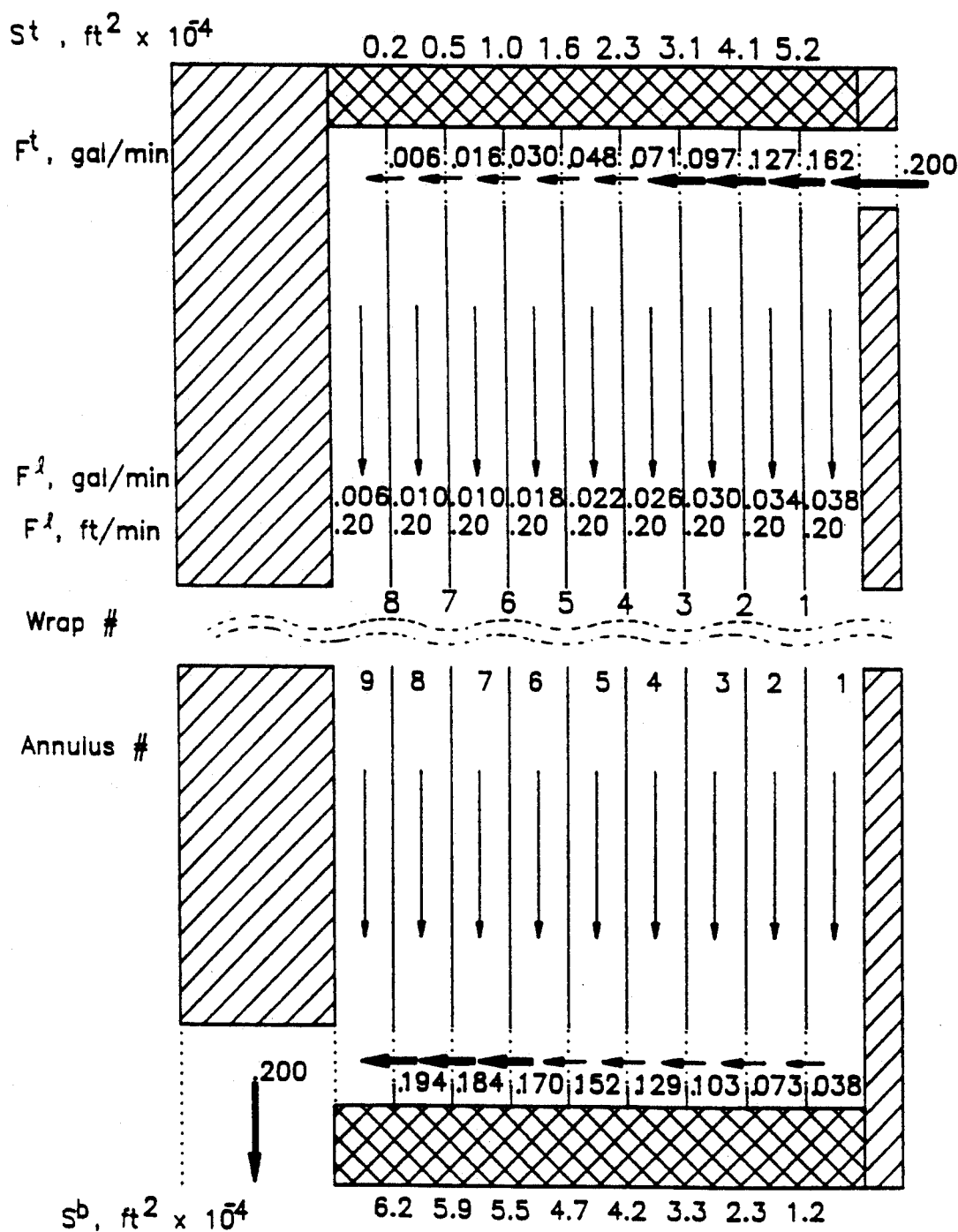
FIG. 3 is a longitudinal view of the segment A—B of FIG. 1 or FIG. 2.

The counter-current permeator design can be more easily understood by looking at the figures. FIG. 1 is a cross-section of the concentric ring design, with each individual ring (R) numbered from one to nine. Any number of rings can be used in this design, although the degree of contacting efficiency will increase with the number of rings. In FIG. 1 item (1) is the center mandrel core, (2) is the permeator vessel shell and $R_1$-$R_8$ are the concentric rings perforated at top and bottom. FIG. 3 is a longitudinal view of the segment A—B of FIG. 1. Here, the perforations can be seen at the top and bottom of each ring.

Figure 2:
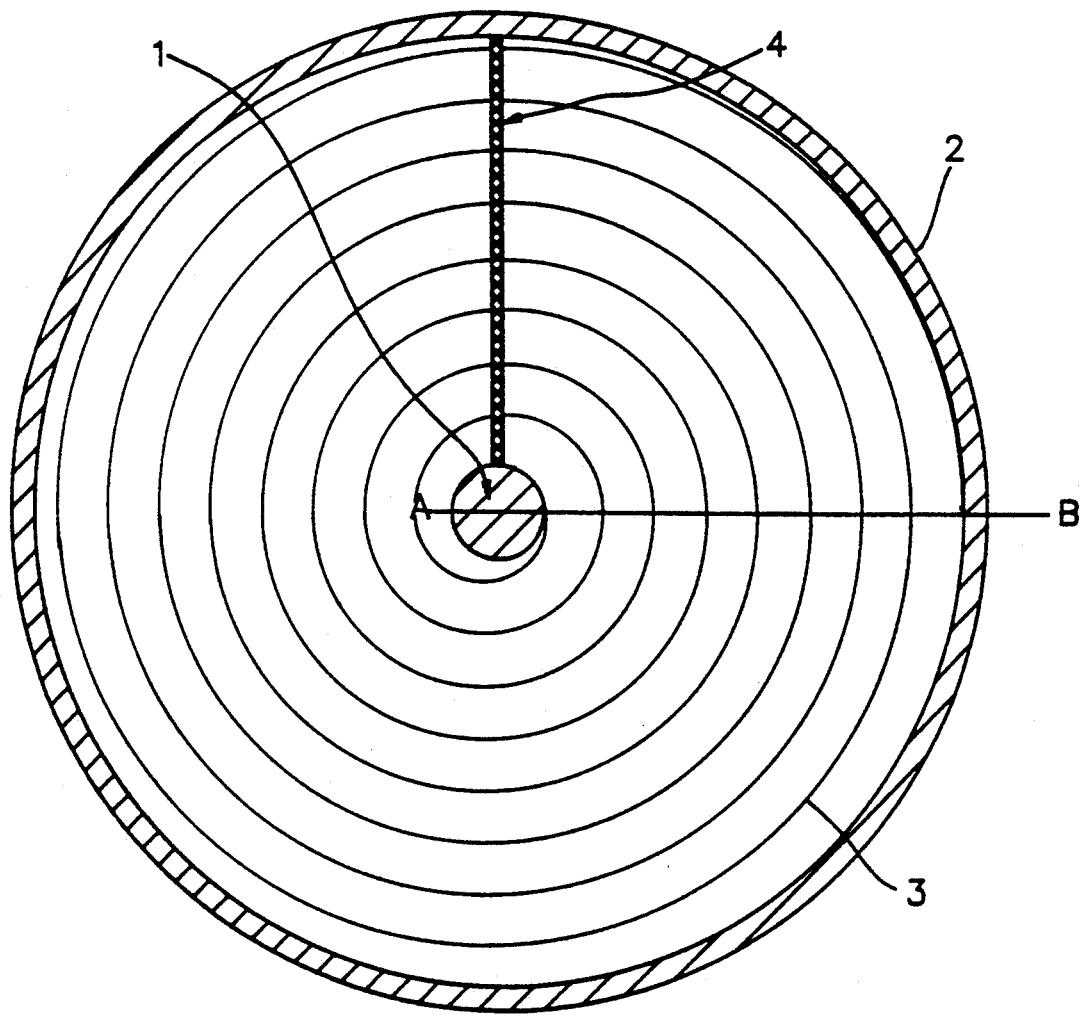
FIG. 2 is a cross-section of the spiral wrap chamber hollow fiber bundle.

An alternative to the concentric ring design is to wrap the fibers in a continuous sheet that is perforated at the top and bottom. In order to eliminate the undesirable spiral flow, an unpermeable block line extending the length of the wrap and parallel to the central mandrel, such as a glue line, is placed along the length of each spiral every 360° during construction. The advantage of this design is ease of manufacture, since the perforated sheet can be wrapped using one continuous sheet. A cross-sectional view of this type of permeator is given in FIG. 2. In FIG. 2 (1) is the center mandrel core, (2) is the permeator vessel shell (3) is the spiral wrap and (4) is the unpermeable block line extending the length of the spiral wrap. If desired, an insert can be glued to the wrapping material in place of a thick glue line.

In FIG. 3, the arrows at the top and bottom of the permeator denote the shell side fluid flow, with the size of the arrows qualitatively representing the amount of flow through each of the perforations. Fluid enters the side of the permeator through a series of perforations at the top of the outer permeator shell. Fluid flow into the permeator and to each series of perforations along the top of the concentric rings is shown by $F^T$ (flow, top). The fluid enters the first annulus, where a portion of the fluid flows down the annulus parallel to the hollow fibers while the remainder traverses through the perforations of the first ring into the second annulus. Again, a portion of the fluid travels down the second annulus while the remainder of the fluid continues through the perforations of the second ring into the third annulus. This partitioning of flow continues until the fluid reaches the last annulus, where the remainder of the fluid travels to the bottom of the permeator. Note that at the top of the permeator, the volumetric flow continues to decrease as it approaches the center of the permeator, while at the bottom of the permeator, the fluid flow continues to increase as it approaches the center of the permeator.

The flow rate down each of the annuli ($F^1$) is set by adjusting the pressure drop across the perforations in the top and the bottom of the rings or each turn of the spiral wrap. In order to achieve the best efficiency, the shell side flow down each of the annuli should be proportional to the total surface area of all the fibers in each annuli. For annuli of constant thickness, the volumetric flow rate through the most outer annulus (containing the highest number of fibers and hence the highest total surface area) will be the highest, while the flow rate through the most inner annulus (containing the smallest number of fibers and hence the lowest total surface area) will be the lowest.

It has been found that in order to obtain an optimum distribution of flow down each annulus, the amount and size of the perforations should be set such that the pressure drop across the top of an individual ring or each turn of the spiral wrap is equal to the pressure drop across the bottom of the ring on each turn of the spiral wrap. Due to the different rates of flow across the top of the ring or each turn of the spiral wrap relative the bottom, however, the size and/or amount of perforations must be different at the top of the ring or each turn of the spiral wrap versus the bottom. $S^T$ is the total cross sectional area of the top or inlet perforations in a given concentric ring. $S^B$ is the total cross sectional area of the bottom or outlet perforations in a given concentric ring. For example, in ring or turn number 1, the open area needed to obtain a given pressure drop is much higher across the top of the ring or spiral wrap turn than at the bottom, since the flow rate through the perforations at the top of the ring or spiral wrap turn is much higher than at the bottom of the ring or spiral wrap turn. In ring or spiral wrap turn 8, however, the open area of the perforations must be much lower at the top than at the bottom, since the flow rate through the perforations at the top of ring or spiral wrap turn 8 is much lower than the flow rate at the bottom of ring or spiral wrap turn 8.

In order to obtain a constant linear velocity down each annuli, the number and area of the holes must obey the following equations:

$$f_n^T = 1 - \left( \frac{\sum_{x=1}^{n} A_x^l}{A} \right) \quad (1)$$

$$f_n^B = \frac{\sum_{x=1}^{n} A_x^l}{A} (1 + r) \quad (2)$$

$$f_n^l = \frac{A_n^l}{A} \quad (3)$$

$$\frac{A_n^T}{A_n^B} = \left( \frac{A}{\sum_{x=1}^{n} A_x^l} - 1 \right) \left( \frac{1}{1 + r} \right) \quad (4)$$

wherein:

$f^T_n$=fraction of the inlet shell side flow through the inlet perforations in a particular annuli at the top or inlet end $f^B_n$=fraction of the inlet shell side flow through the perforation in a particular annuli at the bottom or outlet end $A^l_x$=Cross sectional area through a particular annulus A = total cross sectional area through all annuli of the permeator n = the particular annulus $f^I_n$ = fraction of the inlet shell side flow through the length of a particular annulus $A^I_n$ = area of a particular annulus $A^T_n$ = area of inlet perforations of a particular ring at the top or inlet end $A^B_n$ = area of outlet perforations of a particular ring at the bottom or outlet end r = P/F where P = net flow through the membrane from the tube side to the shell side of the element F = Flow of shell side fluid into the permeator.

When the net flow through the membrane is from the shell side to the tube side of the element r and P will be negative indicative of the reduced volume of fluid exiting the permeator on the shell side as compared to the amount of fluid which entered the permeator on the shell side.

In designing the permeator, attention is paid to the pressure drop across the permeator and is usually set before permeator construction. The following equations reflect the consideration of pressure drop in element design and conditions when the perforations take the form of small circular holes:

$$f_n^T = A_n^T C \frac{\left(\frac{2 g_c}{\rho} \Delta P_n\right)^{\frac{1}{2}}}{F} \quad (5)$$

$$f_n^B = A_n^B C \frac{\left(\frac{2 g_c}{\rho} \Delta P_n\right)^{\frac{1}{2}}}{F} \quad (6)$$

wherein:

C = orifice constant $\rho$ = density of the flowing fluid $\Delta P_n$ = pressure drop $g_c$ = gravitational constant F = Inlet flow to the shell side of the permeator $f^T_n$ = fraction of the total flow through the inlet perforations in a particular annuli at the top or inlet end $f^B_n$ = fraction of the total flow through the outlet perforations in a particular annuli at the bottom or outlet end.

In order to minimize the potential for flow maldistribution due to small differences in fiber packing density, the pressure drop across each of the rings should be significantly higher than the pressure drop across the length of each annulus.

The tube side fluid travels though the hollow fibers from the bottom of the permeator to the top, so that the two fluids travel in parallel, but in opposite directions to one another. The type of flow is necessary to ensure a counter-flow geometry.

Note that various flow geometries can be used in each of these designs. For example, either of the two fluids can be used as the shell side fluid. Also with the proper design consideration, the counter-current permeator can be designed to operate with the shell side inlet being at the outer periphery of the permeator (and the outlet at the core) or the inlet at the core of the permeator (and the outlet at the periphery). Finally, the permeator can be operated so that the shell side flow is upflow, downflow, or horizontal.

This permeator can be used in any application where the shell side fluid flow is important. The counter-current capabilities are especially important in perstraction, membrane enhanced extraction, membrane reactors, and dialysis. Other uses are in the processes of reverse osmosis, ultrafiltration, and pervaporation.

The mandrel can be of any diameter, although it should be kept small relative to the diameter of the finished permeator to maximize the amount of fibers, and hence the surface area of the permeator. The mandrel can be made of either a solid rod with a short section of pipe or conduit attached to the bottom, or it can be a pipe or conduit capped at the top. The bottom of the mandrel is be open to the shell side through holes or openings to allow flow of the shell side fluid out of the bottom of the mandrel.

The hollow fibers can be of any diameter although inside diameters of less than 2000 microns and outside areas of 4000 microns are preferred for maximum surface area. The fibers can be made of either polymeric, ceramic, or metallic materials and should allow permeation of components of the fluid that is to be separated. The fibers may be porous, non-porous, or a composite of a fiber coated with a selective membrane film.

The perforated sheet can be made from either a thin polymeric or metallic sheet. The thickness and composition of the sheet should be set so as to maximize ease of assembly while at the same time having enough strength to support some pressure drop across the perforations. The sheet should be solid and non-porous except at the top and bottom perforations used to direct the flow of the shell side fluid.

The perforations can be circular holes, slits, or any other geometry that allows for flow of the shell side fluid though the perforations. The size and quantity of the perforations can be varied as long as the total open area across the perforations in a ring is set to obtain the desired pressure drop. Contacting efficiency is best maximized, however, when one uses many small perforations evenly distributed across the top and the bottom of the ring, as close to the tube sheet as possible. The holes need not be in alignment, however, if the holes are in alignment more than one series of holes can be used. If two series are used, it is preferred that they be at opposite sides of the rings set 180° apart. If three series are used, it is preferred that they be set 120° apart. There may be as many fluid entry means in the vessel shell wall as there are series of holes, the fluid entry means being either in substantial linear alignment with the outer periphery holes or in staggered alignment.

EXAMPLE

A computer simulation was done on the concentric ring design to establish the flows and pressure drops that are to be expected in a commercial sized permeator assuming outlet flow equal to inlet flow (i.e., no net permeation through the membrane). This example is offered as a flow dynamics study. The following design basis was assumed:

| | |
|---|---|
| Permeator Diameter (Ex. Shell), " = | 5.0 |
| Shell Side Flow Rate, gal/minute = | 0.2 |
| Number of Annuli = | 9 |
| Annuli Width, " = | 0.25 |
| Perforation Pressure Drop, psig = | 1.0 |

| -continued | |
|---|---|
| Net Flow Through Membrane = | 0.0 |

These design basis were employed in equations 1–6 above.

The results of the simulation are given in FIG. 3. This figure shows the shell side fluid flow rates through the top ($F^t$) and bottom ($F^b$) perforations and along the length ($F^l$ in gal/min) of the permeator. Also shown is the total cross-sectional area of the perforations along the top ($S^t$) and bottom ($S^b$) of each ring. Note that at the top, the total area of perforations must be reduced from $5.2 \times 10^{-4}$ ft$^2$ in the first ring to $0.2 \times 10^{-4}$ ft$^2$ in the eighth ring. Conversely, at the bottom of the permeator, the first ring has the least amount of surface area of perforations, at $1.2 \times 10^{-4}$ ft$^2$, while the eighth ring contains the highest surface area of perforations at $6.2 \times 10^{-4}$. Also note the linear flow rates $F^l$ in ft/min along the length of each annuli is the same.

We claim:

1. A counter-current flow pattern hollow-fiber permeator comprising a central mandrel perforated at one end and plugged at the other, a bundle of hollow fibers arranged parallel to and extending the length of the central mandrel, a series of concentric rings coaxial with the central mandrel and dividing the bundle of hollow fibers into discrete compartments, the series of concentric rings containing perforations along the top (inlet perforations) and bottom (outlet perforations) at either end of the rings and perpendicular to the axis of the central mandrel wherein the central mandrel, the hollow fibers and the perforated concentric rings in the hollow fiber bundle are embedded at opposite ends in tube sheets and surrounded by a vessel shell, the tube sheets at either end of the central mandrel-hollow fiber assembly being in fluid tight contact with the interior wall of the vessel shell and wherein the central mandrel and hollow fibers extend through the tube sheets, said tube sheets defining interior and exterior zones in the permeator and wherein the perforations in the central mandrel and at either end of the concentric rings are contained in the interior zone of the permeator, said vessel shell containing openings in one end of the vessel wall in proximity to the tube sheet and opening into the interior zone of the permeator and located opposite to the perforated end of the central mandrel, said openings in the vessel wall operating as fluid inlet means permitting introduction of a first fluid into the permeator for passage through the inlet perforations and passage along the shell side of the hollow fibers and wherein the first fluid is accumulated by passage through the outlet perforations at the opposite end of the rings to the inlet perforations at the perforated end of the central mandrel and removed thereby from the permeator, the ends of the vessel shell being capped by end pieces creating manifold means into which extend the ends of the hollow fibers extending through the tube sheets, said manifold means permitting introduction of a second fluid into the permeator for tube side flow and recovery of said fluid from the permeator, the unplugged end of the central manifold extending beyond the end capping manifold means operating as fluid passage means.

2. A counter-current flow pattern hollow-fiber permeator comprising a central mandrel perforated at one end and plugged at the other, a bundle of hollow fibers arranged parallel to and extending the length of the central mandrel, a spiral wrap extending radially outward from and coaxial with the central mandrel, said spiral wrap including an impermeable line extending longitudinally down the length of the spiral wrap parallel to the central mandrel and located every 360° within the turns of the spiral wrap to prevent spiral fluid flow through the wrap and dividing the bundle of hollow fibers into discrete compartments, the spiral wrap containing perforations along the top (inlet perforations) and bottom (outlet perforations) at either end of the spiral wrap and perpendicular to the axis of the central mandrel wherein the central mandrel, the hollow fibers and the perforated spiral wrap in the hollow fiber bundle are embedded at opposite ends in tube sheets and surrounded by a vessel shell, the tube sheets at either end of the central mandrel-hollow fiber assembly being in fluid tight contact with the interior wall of the vessel shell and wherein the central mandrel and hollow fibers extend through the tube sheets said tube sheet defining interior and exterior zones in the permeator and wherein the perforations in the central mandrel and at either end of the spiral wrap are contained in the interior zone of the permeator, said vessel shell containing openings in one end of the vessel wall in proximity to the tube sheet and opening into the interior zone of the permeator and located opposite to the perforated end of the central mandrel, said openings in the vessel wall operating as fluid inlet means permitting introduction of a first fluid into the permeator for passage through the inlet perforations and passing said fluid along the shell side of the hollow fibers, and wherein the first fluid is accumulated by passage through the outlet perforations at the opposite end of the spiral wrap to the inlet perforations at the perforated end of the central mandrel and removed thereby from the permeator, the ends of the vessel shell being capped by end pieces creating manifold means into which extend the ends of the hollow fibers extending through the tube sheets, said manifold means permitting introduction of a second fluid into the permeator for tube side flow and recovery of said fluid from the permeator, the unplugged end of the central manifold extending beyond the end capping manifold means operating as fluid passage means.

3. The counter-current flow pattern hollow-fiber permeator of claim 1 wherein to obtain a constant linear fluid velocity down the annuli of each discrete concentric hollow fiber compartment the areas of the inlet and outlet perforations in each concentric ring follow the following equations:

$$f_n^T = 1 - \left( \frac{\sum\limits_{x=1}^{n} A_x^l}{A} \right) \quad (1)$$

$$f_n^B = \frac{\sum\limits_{x=1}^{n} A_x^l}{A} (1 + r) \quad (2)$$

$$f_n^l = \frac{A_n^l}{A} \quad (3)$$

$$\frac{A_n^T}{A_n^B} = \left( \frac{A}{\sum\limits_{x=1}^{n} A_x^l} - 1 \right)\left( \frac{1}{1 + r} \right) \quad (4)$$

wherein:

$f^T_n$ = fraction of the inlet shell side flow through the inlet perforations in a particular annuli at the top or inlet end $f^B_n$ = fraction of the inlet shell side flow through the outlet perforation in a particular annuli at the bottom or outlet end $A^l_x$ = Cross sectional area through a particular annuli $A$ = total cross sectional area through all annuli of the permeator $n$ = the particular annulus $f^l_n$ = fraction of the inlet shell side flow through the length of a particular annulus $A^l_n$ = area of a particular annulus $A^T_n$ = area of inlet perforations of a particular ring at the top or inlet end $A^B_n$ = area of outlet perforations of a particular ring at the bottom or outlet end $r = P/F$ where $P$ = net flow through the membrane from the tube to the shell side of the element $F$ = Flow of shell side fluid into the permeator.

4. The counter-current flow pattern hollow-fiber permeator of claim 2 wherein to obtain a constant linear fluid velocity down the annuli of each discrete concentric hollow fiber compartment the area of the perforations in each turn of the spiral wrap follows the following equations:

$$f_n^T = 1 - \left( \frac{\sum_{x=1}^{n} A_x^l}{A} \right) \quad (1)$$

$$f_n^B = \frac{\sum_{x=1}^{n} A_x^l}{A} (1 + r) \quad (2)$$

$$f_n^l = \frac{A_n^l}{A} \quad (3)$$

$$\frac{A_n^T}{A_n^B} = \left( \frac{A}{\sum_{x=1}^{n} A_x^l} - 1 \right) \left( \frac{1}{1+r} \right) \quad (4)$$

wherein:

$f^T_n$ = fraction of the inlet shell side flow through the inlet perforations in a particular annuli at the top or inlet end $f^B_n$ = fraction of the inlet shell side flow through the outlet perforation in a particular annuli at the bottom or outlet end $A^l_x$ = Cross sectional area through a particular annuli $A$ = total cross sectional area through all annuli of the permeator $n$ = the particular annulus $f^l_n$ = fraction of the inlet shell side flow through the length of a particular annulus $A^l_n$ = area of a particular annulus $A^T_n$ = area of inlet perforations of a particular ring at the top or inlet end $A^B_n$ = area of outlet perforations of a particular ring at the bottom or outlet end $r = P/F$ where $P$ = net flow through the membrane from the tube to the shell side of the element $F$ = Flow of shell side fluid into the permeator.

5. The permeator of claim 1 wherein the perforations in the concentric rings are in linear alignment.

6. The permeate of claim 1 wherein the perforation in the concentric rings are in staggered alignment.

7. The permeate of claim 2 wherein the perforation in each turn of the spiral wrap are in linear alignment.

8. The permeator of claim 2 wherein the perforations in each turn of the spiral wrap are in staggered alignment.

9. The counter-current flow pattern hollow-fiber permeator of claim 3 wherein to obtain a constant linear fluid velocity down the annuli of each discrete concentric hollow fiber compartment, the perforations are in the form of small circular holes and the area of the perforations in each concentric ring follow the following additional equations:

$$f_n^T = A_n^T C \frac{\left( \frac{2g_c}{\rho} \Delta P_n \right)^{\frac{1}{2}}}{F} \quad (5)$$

$$f_n^B = A_n^B C \frac{\left( \frac{2g_c}{\rho} \Delta P_n \right)^{\frac{1}{2}}}{F} \quad (6)$$

wherein:

$C$ = orifice constant $\rho$ = density of the flowing fluid $\Delta P_n$ = pressure drop $g_c$ = gravitational constant $F$ = Inlet flow to the shell side of the permeator.

10. The counter-current flow pattern hollow-fiber permeator of claim 4 wherein to obtain a constant linear fluid velocity down the annuli of each discrete concentric hollow fiber compartment the perforation are in the form of small circular holes and the area of the perforations in each concentric ring follows the following additional equations:

$$f_n^T = A_n^T C \frac{\left( \frac{2g_c}{\rho} \Delta P_n \right)^{\frac{1}{2}}}{F} \quad (5)$$

$$f_n^B = A_n^B C \frac{\left( \frac{2g_c}{\rho} \Delta P_n \right)^{\frac{1}{2}}}{F} \quad (6)$$

wherein:

$C$ = orifice constant $\rho$ = density of the flowing fluid $\Delta P_n$ = pressure drop $g_c$ = gravitational constant $F$ = Inlet flow to the shell side of the permeator.

* * * * *